US008303418B2

(12) United States Patent
Burke et al.

(10) Patent No.: US 8,303,418 B2
(45) Date of Patent: Nov. 6, 2012

(54) FLEX-TIME SCHEDULING OF ELECTRONIC GAMING MACHINES

(75) Inventors: Mary M. Burke, Somonauk, IL (US); Michael R. Bytnar, Naperville, IL (US)

(73) Assignee: WMS Gaming Inc., Waukegan, IL (US)

( * ) Notice: Subject to any disclaimer, the term of this patent is extended or adjusted under 35 U.S.C. 154(b) by 467 days.

(21) Appl. No.: 12/528,663

(22) PCT Filed: Feb. 12, 2008

(86) PCT No.: PCT/US2008/001834
§ 371 (c)(1),
(2), (4) Date: Aug. 26, 2009

(87) PCT Pub. No.: WO2008/106008
PCT Pub. Date: Sep. 4, 2008

(65) Prior Publication Data
US 2010/0203954 A1 Aug. 12, 2010

Related U.S. Application Data

(60) Provisional application No. 60/904,252, filed on Mar. 1, 2007.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................... 463/43; 463/40; 463/42

(58) Field of Classification Search ........................ None
See application file for complete search history.

(56) References Cited

U.S. PATENT DOCUMENTS 5,487,170 A * 1/1996 Bass et al. .................... 710/244
(Continued)

FOREIGN PATENT DOCUMENTS

GB 2406291 A 3/2005
(Continued)

OTHER PUBLICATIONS

Written Opinion corresponding to co-pending International Patent Application Serial No. PCT/US2008/001834, European Patent Office; dated Jun. 20, 2008; 5 pages.

(Continued)

*Primary Examiner* — David L Lewis
*Assistant Examiner* — Shauna-Kay Hall
(74) *Attorney, Agent, or Firm* — Nixon Peabody LLP

(57) ABSTRACT

An illustrative method controls changes to be made in electronic gaming machines (EGMs) that permit wagering on games. A schedule of conditions to be implemented by one or more EGMs is stored in memory. The schedule includes records containing the identity of an EGM, conditions to be implemented by the identified EGM, dates on which the conditions are to be implemented, and start and end times during which the implementation is to occur. Each record stores a priority parameter. It is determined that at least two records are to be implemented on the same date such that a time overlap in servicing the implementation of first and second conditions associated with the first and second records would result. A time sequence of execution of the first and second records is determined based on the respective priority parameters of each of the first and second records. The execution of the first and second records is caused in accord with the determined sequence to avoid the time overlap in servicing the implementation of first and second conditions.

20 Claims, 5 Drawing Sheets

U.S. PATENT DOCUMENTS

| | | | | |
|---|---|---|---|---|
| 6,006,034 | A * | 12/1999 | Heath et al. | 717/170 |
| 6,354,943 | B1 * | 3/2002 | Miura | 463/29 |
| 6,383,076 | B1 * | 5/2002 | Tiedeken | 463/40 |
| 6,645,077 | B2 * | 11/2003 | Rowe | 463/43 |
| 6,884,173 | B2 * | 4/2005 | Gauselmann | 463/42 |
| 7,921,302 | B2 * | 4/2011 | Gatto et al. | 713/191 |
| 7,951,008 | B2 * | 5/2011 | Wolf et al. | 463/43 |
| 2001/0055990 | A1 | 12/2001 | Acres | |
| 2002/0058550 | A1 * | 5/2002 | Pace et al. | 463/42 |
| 2002/0152120 | A1 * | 10/2002 | Howington | 705/14 |
| 2003/0176213 | A1 * | 9/2003 | LeMay et al. | 463/20 |
| 2005/0192099 | A1 * | 9/2005 | Nguyen et al. | 463/42 |
| 2006/0079310 | A1 | 4/2006 | Friedman et al. | |
| 2006/0268321 | A1 * | 11/2006 | Brack et al. | 358/1.15 |
| 2007/0026935 | A1 | 2/2007 | Wolf et al. | |
| 2007/0105628 | A1 * | 5/2007 | Arbogast et al. | 463/42 |
| 2007/0111791 | A1 * | 5/2007 | Arbogast et al. | 463/40 |
| 2007/0218998 | A1 * | 9/2007 | Arbogast et al. | 463/42 |
| 2007/0243934 | A1 * | 10/2007 | Little et al. | 463/40 |
| 2008/0200256 | A1 * | 8/2008 | Gagner et al. | 463/42 |
| 2008/0200259 | A1 * | 8/2008 | Deng | 463/42 |
| 2008/0214307 | A1 * | 9/2008 | Arbogast et al. | 463/42 |
| 2009/0156313 | A1 * | 6/2009 | Blackburn et al. | 463/42 |

FOREIGN PATENT DOCUMENTS

| | | | |
|---|---|---|---|
| WO | WO 2005/069235 | A1 | 7/2005 |
| WO | WO 2007/008413 | A1 | 1/2007 |

OTHER PUBLICATIONS

International Search Report corresponding to co-pending International Patent Application Serial No. PCT/US2008/001834, European Patent Office; dated Jun. 20, 2008; 4 pages.

* cited by examiner

FIG. 3

| INSTRUCTION NUMBER (80) | EGM ID (82) | CHANGE TO BE MADE (84) | DATE / INTERVAL (86) | FLEX-TIME START (88) | FLEX-TIME END (90) | PRIORITY / CONDITION (92) | TIME REQUIRED FOR CHANGE (94) | OTHER PARAMETERS OF CHANGE (96) |
|---|---|---|---|---|---|---|---|---|
| 1 | WMS12 | PTU3 | 3 /10/2007 | 16:00 | 17:00 | 3 | 1 | |
| 2 | WMS13 | MMW8 | F-SAT-SUN | 16:00 | 17:00 | 5 | 2 | |
| 3 | WMS17 | AUD5 | WED | 09:30 | 10:00 | <ALL | 1 | |
| 4 | WMS08 | UPD2 | 3 /13/2007 | 03:00 | 04:00 | <NG# | 10 | |
| 5 | WMS23 | NG4 | 3 /13/2007 | 03:00 | 04:00 | BY END | 35 | |
| 6 | WMS45 | PTU2 | 3 /9 /2007 | 15:00 | 15:30 | 2 | 1 | |
| 7 | WMS45 | AUD3 | 3 /9 /2007 | 15:00 | 15:30 | 5 | 1 | |
| | | | | | | | | |
| N | | | | | | | | |

FLEX-TIME SCHEDULING OF ELECTRONIC GAMING MACHINES

CROSS-REFERENCE TO RELATED APPLICATIONS

This application is a U.S. National Stage of International Application No. PCT/US2008/001834, filed Feb. 12, 2008, which claims the benefit of U.S. Provisional Application No. 60/904,252, filed on Mar. 1, 2007, both of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to the management and control of electronic gaming machines (EGMs) that support wagering on wagering games, and more particularly to controlling schedules of events to be acted upon by electronic gaming machines.

BACKGROUND OF THE INVENTION

Gaming machines, such as slot machines and video poker machines, have been a cornerstone of the gaming industry for several years. Shrewd operators strive to monitor the amount of play of different types of gaming machines and manage different operating conditions for games and the mixture of different games to attract frequent play and hence increase profitability to the operator. Therefore, there is a continuing need for gaming machine manufacturers to continuously develop new techniques for managing different games and gaming features on remotely reconfigurable gaming machines to maximize frequent play.

A centralized gaming controller, e.g. an administration, operation and maintenance server (AOM), permits the operator to change the game being executed by an EGM to another game as well as varying characteristics of a game being executed. Typically a controller communicates to each EGM individually to convey changes. Managing a variety of schedules for multiple EGMs at the controller can be cumbersome and result in implementation errors such as when schedules are inadvertently set to be executed by the controller simultaneously to control different EGMs or when a schedule would result in a time overlap needed to service the implementation of multiple conditions.

SUMMARY OF THE INVENTION

According to one aspect of the present invention, an illustrative method controls changes to be made in EGMs that permit wagering on games. A schedule of conditions to be implemented by one or more EGMs is stored in memory. The schedule includes records containing the identity of an EGM or group of EGMs, conditions to be implemented by the identified EGM, dates on which the conditions are to be implemented, and start and end times during which the implementation is to occur. Each record may store a priority parameter. A priority parameter may be empirically calculated and may also be based on the seniority or priority of the logged in user. It is determined that at least two records are to be implemented on the same date such that a time overlap in servicing the implementation of first and second conditions associated with the first and second records would result. A time sequence of execution of the first and second records is determined based on the respective priority parameters of each of the first and second records. The execution of the first and second records is caused in accord with the determined sequence to avoid the time overlap in servicing the implementation of first and second conditions.

According to another aspect of the invention, a server implements the above described method.

A further aspect of the invention resides in an EGM that implements the above described method.

According to yet another aspect of the invention, a computer readable & nonvolatile storage medium is encoded with instructions for directing a server to perform the above method.

According to another aspect of the invention, a computer readable & nonvolatile storage medium is encoded with instructions for directing an EGM to perform the above method.

Additional aspects of the invention will be apparent to those of ordinary skill in the art in view of the detailed description of various embodiments, which is made with reference to the drawings, a brief description of which is provided below. The use of the same reference numeral in the drawings is utilized to denote identical or similar elements.

BRIEF DESCRIPTION OF THE DRAWINGS

FIG. 3 is an exemplary table representing flex-time schedules for gaming machines in accordance with the present invention.

DETAILED DESCRIPTION

Various embodiments of this invention can be utilized. The drawings and descriptions of embodiments of the invention exemplify its principles and are not intended to limit the broad aspect of the invention to only the illustrated embodiments.

Figure 1:
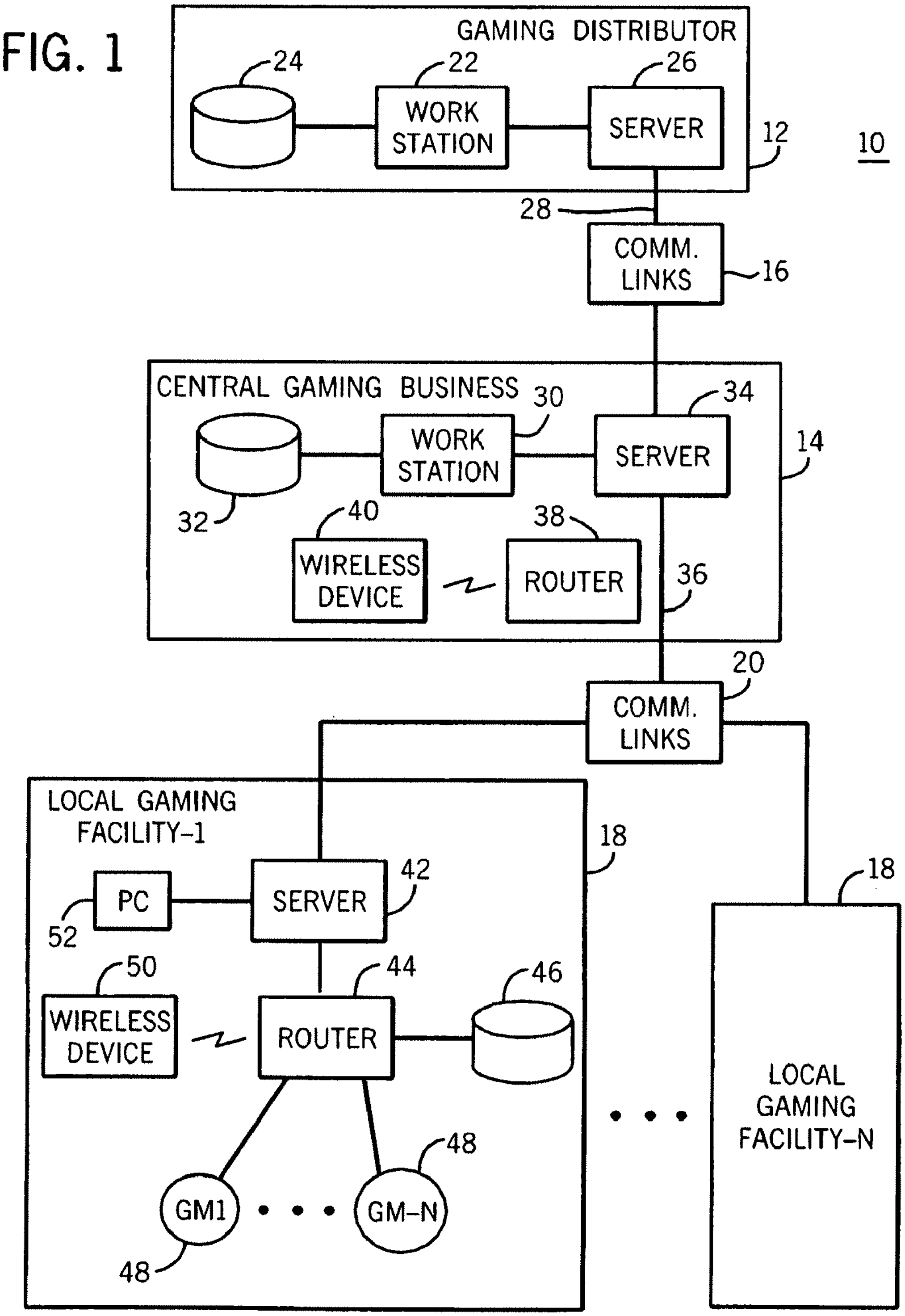
FIG. 1 is a block diagram of a gaming system that includes an embodiment of the present invention.

Referring to FIG. 1, an exemplary gaming system 10 includes a gaming distributor 12 coupled to a central gaming business 14 by communication links 16. Local gaming facilities 18 are connected by communication links 20 to the central gaming business 14. As used herein, "gaming" refers to the use of various games that support the placing of wagers on the outcome of the games, e.g. a video poker machine. The gaming distributor 12 may consist of the creator or distributor of games and/or gaming machines, e.g. WMS Gaming Inc. The central gaming business 14 may consist of centralized operations for a casino or licensed gaming machine operator. The local gaming facilities 18 may consist of geographically separated locations, i.e. different casinos, all owned or controlled by the same central gaming business.

The gaming distributor 12 may include a computer workstation 22 coupled to a nonvolatile memory storage device 24 such as a hard drive. The workstation 22 is also coupled to a server 26 that provides a host for communications over communication channels 28. The workstation 22 may provide a plurality of functions that serve to support the gaming distributor. In accordance with this illustrative embodiment, one function of the workstation 22 is to provide support for the central gaming business 14. For example, the workstation 22 may cause an updated version of a software implemented game stored in device 24 to be downloaded by server 26 to the central gaming business 14 for storage and redistribution to the associated gaming machines at its local gaming facilities.

A central gaming business 14 includes a workstation 30 supported by data storage element 32 and a server 34 that serves as a communication host with the gaming distributor 12 and communication channels 36 coupled to the local gaming facilities 18. The server 34 also supports communication with a router 38 that in turn supports wireless communications with the wireless device 40 which may comprise a laptop computer, personal digital assistant, a data enabled cellular telephone, etc. The wireless device 40 permits users, e.g. administrators and operational personnel of the central gaming business, to receive information generated by workstation 30 as well as information concerning the local gaming facilities 18. It may be utilized to provide data input and instructions to workstation 30.

Each local gaming site 18 includes a server 42 that functions as a host of communications between the subject local gaming facility and the central gaming business 14 and the other local gaming facilities. A router 44 routes communications between the server 42 and other elements including data storage element 46, electronic gaming machines 48 and a wireless communication link with a wireless device 50. The data storage element 46 can be utilized to store control information, gaming machine statistics and gaming programs and/or updates to gaming programs. For example, assume that EGMs 48 at the subject local gaming facility are to be updated with a new version of a game. This new version may have been downloaded from the gaming distributor 12 by the central gaming business 14 and stored in data storage element 32. At an appropriate time under the control workstation 30, the new version is downloaded and stored by the data storage element 46 of each local gaming facility that contains the EGM 48 to receive the new version. The router 44 then downloads into the memory of the appropriate EGMs 48 the new version stored in data element 46.

Alternatively, a new version of the game can be downloaded directly from the central gaming business 14 to the respective EGMs 48. The wireless device 50 is similar to the previously described wireless device 40 and preferably supports bidirectional communications. However, in one exemplary embodiment, wireless device 50 is primarily utilized to display status information to gaming system managers concerning the status and utilization of the EGMs 48 so that the managers are free to roam around the gaming facility. It will be noted that not all of the gaming machines at a particular local gaming facility may be capable of being remotely updated. Those skilled in the art will appreciate that new gaming machines may be designed with sufficient processing and communications ability to be able to be remotely updated and controlled without requiring intermediate processing such as provided by server 42 and router 44. Of course, a gaming system manager may utilize a personal computer 52 connected to server 42, or alternatively to router 44, to display gaming information and provide control instructions for the EGMs 48 located at the same local gaming facility. In addition to changing the game being offered on a gaming machine, a workstation can implement schedules that change parameters and/or features associated with the play of the current game on an EGM.

Figure 2:
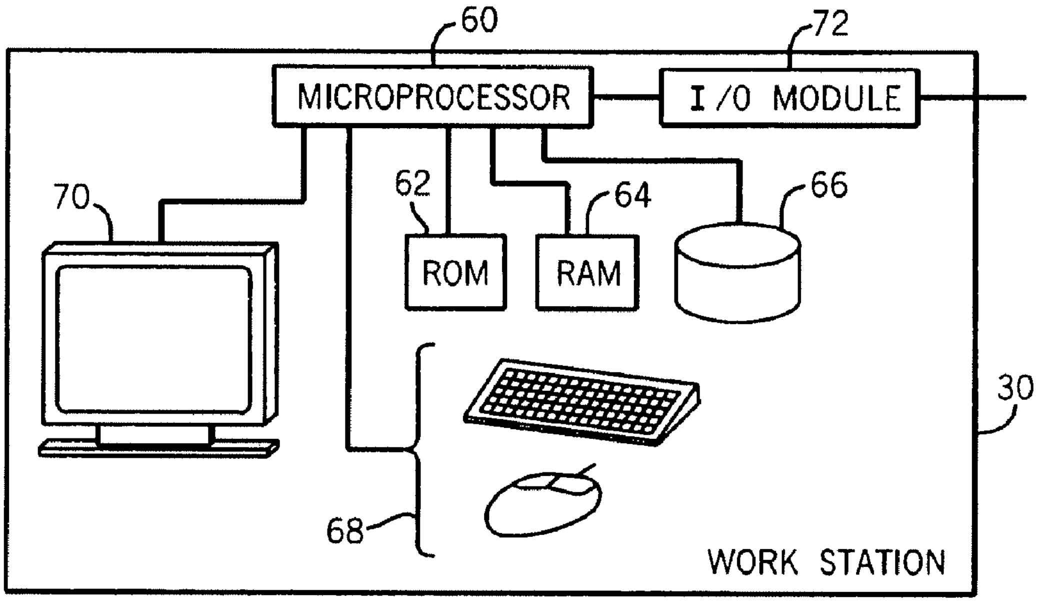
FIG. 2 is a block diagram of a workstation as shown in FIG. 1.

FIG. 2 shows an architecture suitable for workstation 30 and/or PC 52, which in combination with its associated server 34 and 42, respectively, function as an AOM server (controller). It includes a microprocessor 60 that is supported by read-only memory (ROM) 62, random access memory (RAM) 64 and nonvolatile data storage element 66 such as a hard disk. As will be appreciated by those skilled in the art, ROM 62 stores boot-up control instructions and information for microprocessor 60, and RAM 64 normally stores application control instructions and data obtained from data storage element 66 and/or ROM 62 associated with the implementation and running of an application program. Input devices 68 such as a keyboard and/or mouse and an output device 70 such as a monitor are typically coupled by corresponding support modules (not shown) to microprocessor 60 enabling an administrator to provide inputs and observe displayed information. An input/output (I/O) module 72 is coupled to microprocessor 60 and enables bidirectional communications between the microprocessor and external devices thereby allowing the module to transmit instructions to and receive information from the various EGMs. The microprocessor and required supporting elements forms a microprocessing unit.

In one embodiment workstation 30, operating under the control of application software that will be explained in more detail below, supports "flex-time" schedules that control modifications of the operation of remotely reconfigurable EGMs. A flex-time schedule means a schedule in which an event or condition to be changed on an EGM is set to be communicated to the subject EGM within a predetermined period of time, as opposed to being set for communication to the EGM at one specific time. This provides an administrator with increased flexibility and convenience by eliminating potential problems that could result from timing conflicts due to multiple changes being set for implementation by the AOM server at multiple EGMs at the same time.

FIG. 3 shows an illustrative chart that represents records stored in software of an AOM server where each record corresponds to a change programmed by an administrator to be implemented at one or more designated EGMs. Each row identified by an instruction number in column 80 represents a separate record. The identity of the EGM or EGMs to which the change applies is identified in column 82. This column may also contain a label, e.g. group1, representing a defined grouping of EGMs. Column 84 identifies the specific change or changes to be made at the identified EGM by use of labels that correspond to stored instructions/data to be sent to the EGM. For example, PTU3 and PTU2 represent a specific pay table update; MMW 8 represents a defined minimum maximum wager to be allowed at the EGM; AUD5 and AUD3 represent a specified audio output change such as to change the type or volume of sound to be produced by the EGM; UPD2 represents a predefined software update to be made to the existing software being run at the EGM; NG4 represents an identified new gaming software to be downloaded to the identified EGM.

Column 86 defines the date or series of dates that the change associated with the subject record are to be implemented by the AOM server. Information in this column can consist of a conventional month/day/year date or a day or series of days of the week. As indicated in record 2, it may be desirable to change certain parameters of an EGM based on projected periods of frequent play such as during Friday, Saturday, Sunday. Columns 88 and 90 identify the start and end times associated with a flex-time schedule. The start and end time may be relative to a separately scheduled instruction. The start time may be abstractly defined for immediate execution or "now". If desired for the type of change to be made, a random date/time can be used to effectuate a change for an EGM or to distribute the implementation of a change among a group of EGMs. In accordance with the flex-time schedule, the change to be implemented in an EGM pursuant to a subject record is to occur within the time period defined by the flex-time start and end times.

Column 92 defines a priority or condition associated with the execution of the subject record. When multiple records are to be executed by the AOM server during an overlapping flex-time period, the sequence in which each record will be executed is determined by the comparative priority or condition associated with each record. In the illustrative example, numbers in column 92, e.g. records 1-2, represent an absolute assigned priority with one being the highest priority. Records 3-5 each show conditions associated with column 92. In record 3, "<all" represents a comparative priority that is less than all other overlapping records, i.e. to be executed last. The "<NG#" of record 4 indicates that this record is to be executed after any new gaming software download to be executed during the same time interval. The "by end" of record 5 indicates a restriction in which the subject change must be completed by the specified end flex-time. This condition operates in conjunction with data stored in column 94 that defines the time required to implement the subject change. This information may be determined empirically such as by measuring the length of time required to implement the subject change over a number of occurrences for a number of EGMs. In record 5 the "by end" condition is interpreted to require that the downloading/implementation of the new gaming software NG4 at EGM WMS23 be completed by 4 a.m. Since 35 minutes is designated as being required to complete this event, this provides a requirement that the AOM server initiate execution of this record not later than 3:25 a.m. in order to meet the completion requirement. Column 96 represents additional parameters and/or data that can be stored in association with each record that may be needed for the execution of the associated change.

Flex-time scheduling minimizes the potential errors that an administrator could otherwise inadvertently create in scheduling changes with concurrent servicing needs such as would be implemented by the AOM server. For example, because of the flexibility available in specifying a date (column 86), it may not be apparent to the administrator that two different tasks have been scheduled for the same time. Record 1 specifies a date of Mar. 10, 2007 which is a Saturday. Record 2 specifies execution on each of every Friday, Saturday and Sunday. Therefore, a schedule set without the benefit of the subject flex-time concept with an execution time of 16:00 for both records 1 and 2 could create an execution error or concurrent servicing implementation problem. In accordance with the illustrative embodiment, the changes associated with records 1 and 2 are to be implemented any time during the specified flex-time interval. Therefore, on Saturday, Mar. 10, 2007 at 16:00 both records 1 and 2 will become active, and assuming that no other events remain to be completed, record 1 will be executed first since it has a higher priority than record 2.

Records 4 and 5 also have a scheduled time overlap. Because of the "by end" condition of record 5 in conjunction with the 35 minutes required to complete execution, its execution must be started not later than 3:25 a.m. However, record 4 has a requirement that the software update be executed only after any concurrent new gaming software downloads such as required by record 5. Thus, the flex-time scheduling will resolve this overlap by determining that record 5 must be started between 3 a.m.-3:15 a.m. in order to permit it to conclude execution and still provide sufficient time for record 4 to be completed by 4 a.m. Records 6 and 7 show that flex-time scheduling can be used to implement changes for the same EGM.

Figure 4A:
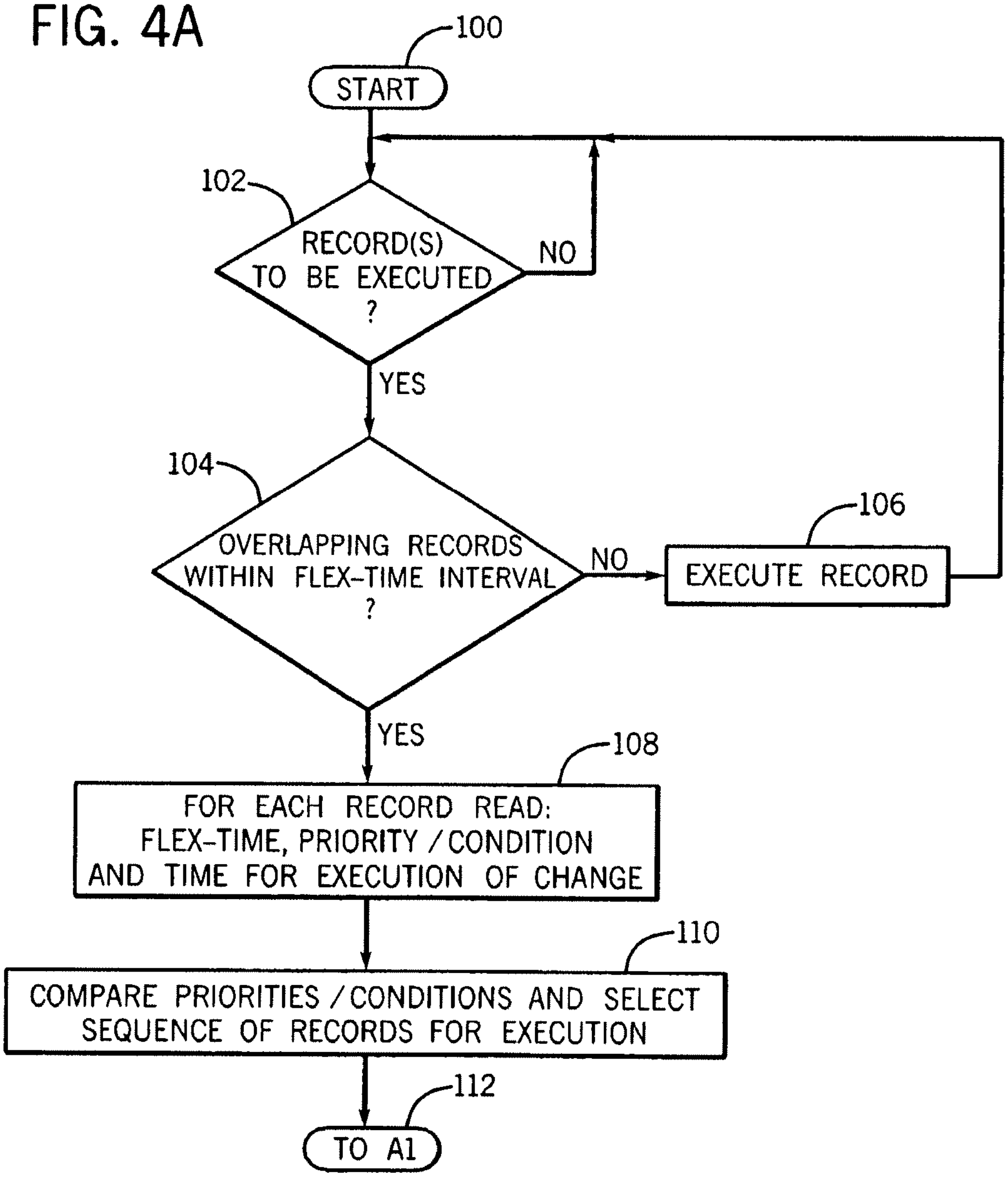
FIGS. 4A and 4B together form a flow diagram of exemplary steps for implementing a flex-time schedule in accord with an embodiment of the present invention.
Figure 4B:
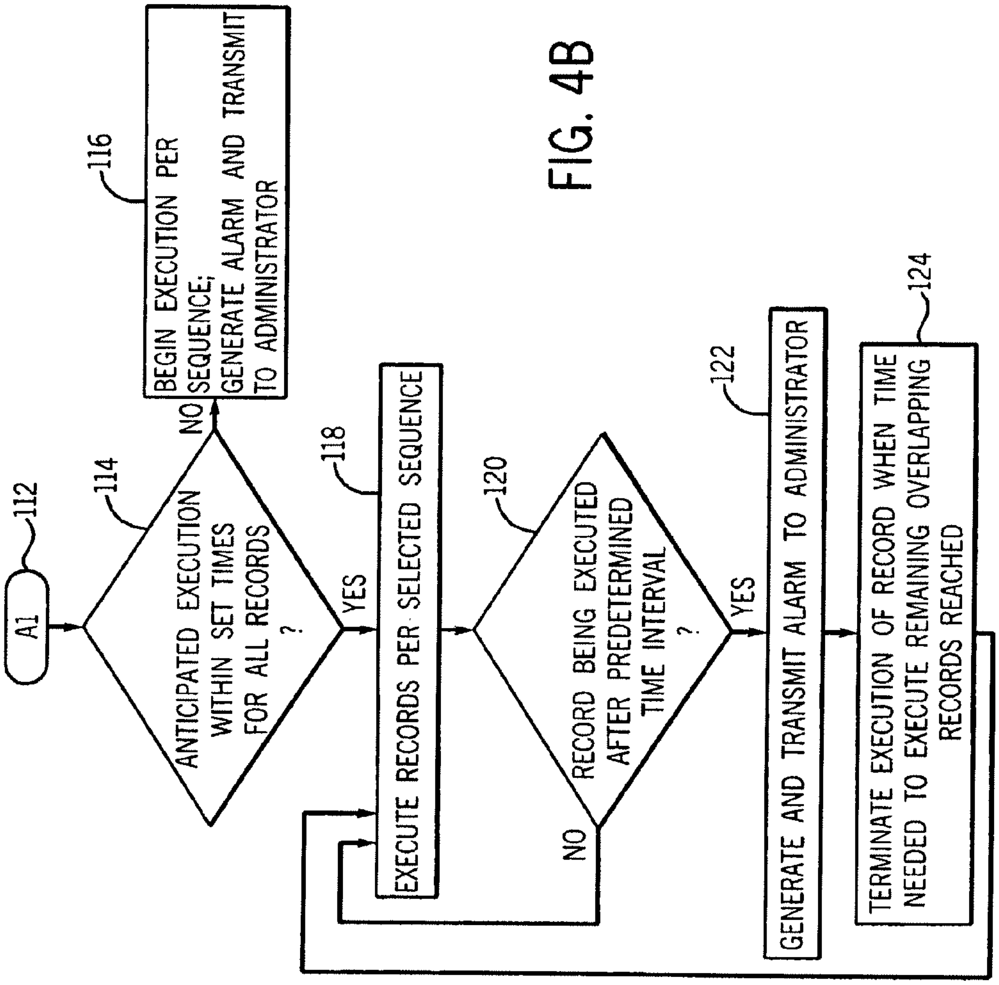

FIGS. 4A and 4B show an illustrative embodiment of a method for practicing the present invention. Beginning at START 100, a determination is made in step 102 of whether record(s) are to be executed. A NO determination by step 102 returns to the beginning of the same step after a predetermined delay interval, e.g. one minute. A YES determination by step 102 results in a further determination in step 104 of whether overlapping records are to be executed within the same flex-time interval. A NO determination by step 104, which means that no overlapping records are present, results in the execution of the record in step 106 and a return to step 102 to await further records to be executed.

A YES determination by step 104, indicating that overlapping records are present within a flex-time interval for execution, results in step 108 causing the information contained in the respective record columns for starting and ending flex-time, priority/condition, and time for execution of change to be read. In step 110 a comparison is made among the records based on priorities/conditions for records having overlapping time intervals. Based on this comparison a sequence for the execution of the subject records is selected. The method continues at A1 112 in FIG. 4B.

Continuing at A1 112 in FIG. 4B, the process continues with step 114 in which a determination is made of whether the anticipated execution for all the records in the selected sequence is anticipated to be completed within the set times, i.e. by the end flex-time for each corresponding record to be executed. A NO determination by step 114 results in processing by step 116 in which execution is begun in accordance with the selected execution sequence, and an alarm is generated and transmitted to the administrator in view of the anticipated lack of compliance with the set times as determined in step 114. The administrator may elect to manually reset a time of execution for one of the records outside of the overlapping time interval to eliminate the time compliance problem. Alternatively, absent a manual intervention by the administrator, the selected sequence will be allowed to continue to execute even though compliance with all set times may not be achieved. A YES determination by step 114, indicating no anticipated problem in executing all of the overlapping records within the set times, results in step 118 executing the subject records in accordance with the selected sequence.

Following step 116 or step 118, a determination is made by step 120 of whether the subject record continues to be executed after a predetermined time interval. For example, the predetermined time interval may be based on the empirically determined time in column 94 for the subject record. In order to provide a safety factor the time interval may be computed to be a percentage greater than the time contained in column 94, e.g. 125% of the time and column 94. A NO determination by step 120, indicating that the current record completed execution without exceeding the predetermined time interval, causes processing to continue in step 118 with the next record in the sequence being selected for execution.

A YES determination by step 120, indicating that the execution of the current record has exceeded the predetermined time interval, results in an alarm being generated and transmitted to the administrator in step 122. This provides notice to the administrator of a potential execution failure based on a lack of execution of the subject change within an anticipated time frame. In step 124 the total time required for a normal anticipated execution of the remaining records in the selected sequence is computed. When the time needed to execute the remaining overlapping records is reached, due to a much longer than anticipated execution time for the current record being executed, the execution of the current record is terminated. This gives the remaining sequence of records an opportunity to be executed within the set times. This process prevents a single execution problem with one record from preventing the other records in the selected sequence from being executed in a timely manner. The processing returns to step 118 where the remaining records in the selected sequence are processed.

In the above embodiment, the steps were explained as being taken during the ongoing running of the system to make or consider making specified changes. Alternatively, steps similar to the steps up to step 118 could be used during programming of the flex-time schedule by an administrator after the input of a new instruction (row in FIG. 3) or series of new instructions to check for conflict problems with other instructions. For example, the entry of a new instruction might cause too many flex-time operations to be scheduled within a specified time interval to all be executed within the set times. In such a case a pre-execution check of entered instructions would preferably discover such a problem by a NO determination at similar step 114 and cause similar step 116 to alert the administrator of the problem prior to the attempted execution of the flex-time schedule. This would allow the administrator to alter either the new input instruction or one of the other conflicting instructions so as to eliminate the problem.

The server and EGMs in one example employs one or more computer readable signal bearing tangible media that stores software, firmware and/or assembly language for performing one or more portions of one or more embodiments of the invention. The computer-readable signal-bearing tangible media in one example comprises one or more of a magnetic, electrical, optical, biological, and atomic data storage medium. For example, the computer-readable signal-bearing media may comprise floppy disks, magnetic tapes, CD-ROMs, DVD-ROMs, hard disk drives, USB flash memory and electronic memory modules.

The steps or operations described herein are only examples. There may be many variations to these steps or operations without departing from the spirit of the invention. For instance, the steps may be performed in a differing order, or steps may be added, deleted, or modified. Although software is described in the illustrative example, the functions of the software may be incorporated as part of firmware, a logic array, or hardware based logic. Although the above illustrative method is described as being implemented by an AOM server, the same or similar process can be utilized by an EGM for executing changes in the EGM, such as when communications with an AOM server is not available. Although the data and commands are illustrated as being contained by records defined by rows in the illustrative table, it will be apparent to those skilled in the art that other data structures can be utilized to store such records.

These embodiments and obvious variations thereof are contemplated as falling within the spirit and scope of the claimed invention, which is set forth in the following claims.

What is claimed is:

1. A method for controlling electronic gaming machines (EGMs) that permit wagering on games comprising the steps of:

storing in memory a schedule of conditions to be implemented by one or more EGMs, the schedule comprising records where each record includes the identity of a first of the one or more EGMs, conditions to be implemented by the first EGM, dates on which the conditions are to be implemented, and start and end times defining an interval during which the implementation is to occur beginning at any time within the interval determined automatically by a controller;

storing with each record a priority parameter that is entered for each record at the time the record is initially stored in memory;

determining that at least first and second records are to be implemented on the same date such that a time overlap in servicing the implementation of first and second conditions associated with the first and second records would result;

determining a serial time sequence of execution of conditions associated with the first and second records based on the respective stored priority parameters of each; and causing the execution of the conditions associated with the one of the first and second records with the highest associated stored priority parameter to begin first in accord with said sequence to avoid said time overlap, where the selection of the one of the first and second records to be first executed is not controlled by the respective start times associated with the first and second records, and where the execution begins at a time within the interval that is different from a time the execution would have begun had the time overlap not occurred.

2. The method of claim 1 further comprising the step of storing with each record an amount of time required to effectuate the condition associated with the record.

3. The method of claim 1 wherein the priority parameter comprises an assigned value associated with a scale of values ranging from a highest priority to a lowest priority.

4. The method of claim 2 wherein the priority parameter of the second record comprises a time T by which the condition associated with the second record is to be completed.

5. The method of claim 4 wherein X amount of time is specified to effectuate the condition associated with the second record, the sequence determining step specifying the sequence of execution of the first and second records such that the executing of the first record is set to occur outside of the interval between time T−X and time T.

6. The method of claim 5 wherein Y amount of time is specified to effectuate the condition associated with the first record, the sequence determining step specifying the sequence of the execution of the first and second records such that the execution of the first record is set to begin prior to time T−X−Y even if the start time stored in the first record specifies a start time that would not satisfy a time prior the T−X−Y time.

7. A server coupled to electronic gaming machines (EGMs) that permit wagering on games where the EGMs and server function in a client/server relationship, the server comprising:

memory that stores a schedule of conditions to be implemented by one or more EGMs, the schedule comprising records where each record includes the identity of an EGM, conditions to be implemented by the identified EGM, dates on which the conditions are to be implemented, and start and end times defining an interval during which the implementation is to occur starting at any time within the interval determined automatically by a microprocessing unit;

each record including a priority parameter that is stored with each record at the time the record is initially stored in memory;

the microprocessing unit determines that at least first and second records are to be implemented on the same date such that a time overlap in servicing the implementation of first and second conditions associated with the first and second records would result;

the microprocessing unit further determines a serial sequence of execution of the first and second records based on the respective stored priority parameters of each; and the microprocessing unit transmitting messages to the respective EGMs associated with the first and second records causing the execution of the conditions associated with the first and second records in accord with said sequence to avoid said time overlap in servicing the implementation of first and second conditions, where the selection of the one of the first and second records to be first executed is not controlled by the respective start times associated with the first and second records such that the starting time of the first execution begins at a time that is different from a time the first execution would have started had the time overlap not occurred.

8. The server of claim 7 further comprising the memory storing with each record an amount of time required to effectuate the condition associated with the record.

9. The server of claim 7 wherein the priority parameter comprises an assigned value associated with a scale of values ranging from a highest priority to a lowest priority.

10. The server of claim 8 wherein the priority parameter of the second record comprises a time T by which the condition associated with the second record is to be completed.

11. The server of claim 10 wherein X amount of time is specified to effectuate the condition associated with the second record, the microprocessing unit selecting the sequence of execution of the first and second records such that the executing of the first record is set to occur outside of the interval between time T−X and time T.

12. The server of claim 11 wherein Y amount of time is specified to effectuate the condition associated with the first record, the microprocessing unit selecting the sequence of the execution of the first and second records such that the execution of the first record is set to begin prior to time T−X−Y even if the start time stored in the first record specifies a start time that would not satisfy a time prior the T−X−Y time.

13. An electronic gaming machine (EGM) that permits wagering on games comprising:

memory that stores a schedule of conditions to be implemented by the EGM, the schedule comprising records where each record includes conditions to be implemented by the EGM, dates on which the conditions are to be implemented, and start and end times defining an interval during which the implementation is to occur beginning at any time within the interval determined automatically by a microprocessing unit;

each record including a priority parameter that is entered for each record at the time the record is initially stored in memory;

the microprocessing unit determines that at least first and second records are to be implemented on the same date such that a time overlap in servicing the implementation of first and second conditions associated with the first and second records would result;

the microprocessing unit further determines a serial sequence of execution of the first and second records based on the respective priority parameters of each;

the microprocessing unit causing the execution of the conditions associated with the first and second records in accord with said sequence to avoid said time overlap in servicing the implementation of first and second conditions, where the selection of the one of the first and second records to be first executed is not controlled by the respective start times associated with the first and second records such that the first execution begins at a time that is different from a time the first execution would have begun had the time overlap not occurred.

14. The EGM of claim 13 further comprising the memory storing with each record an amount of time required to effectuate the condition associated with the record.

15. The EGM of claim 13 wherein the priority parameter comprises an assigned value associated with a scale of values ranging from a highest priority to a lowest priority.

16. The EGM of claim 14 wherein the priority parameter of the second record comprises a time T by which the condition associated with the second record is to be completed.

17. The EGM of claim 16 wherein X amount of time is specified to effectuate the condition associated with the second record, the microprocessing unit selecting the sequence of execution of the first and second records such that the executing of the first record is set to occur outside of the interval between time T−X and time T.

18. The EGM of claim 17 wherein Y amount of time is specified to effectuate the condition associated with the first record, the microprocessing unit selecting the sequence of the execution of the first and second records such that the execution of the first record is set to begin prior to time T−X−Y even if the start time stored in the first record specifies a start time that would not satisfy a time prior the T−X−Y time.

19. The method of claim 1 performed by a server directed by instructions encoded on a non-transitory computer readable storage medium.

20. The method of claim 1 performed by an electronic gaming machine directed by instructions encoded on a non-transitory computer readable storage medium.

* * * * *